Patented May 24, 1938

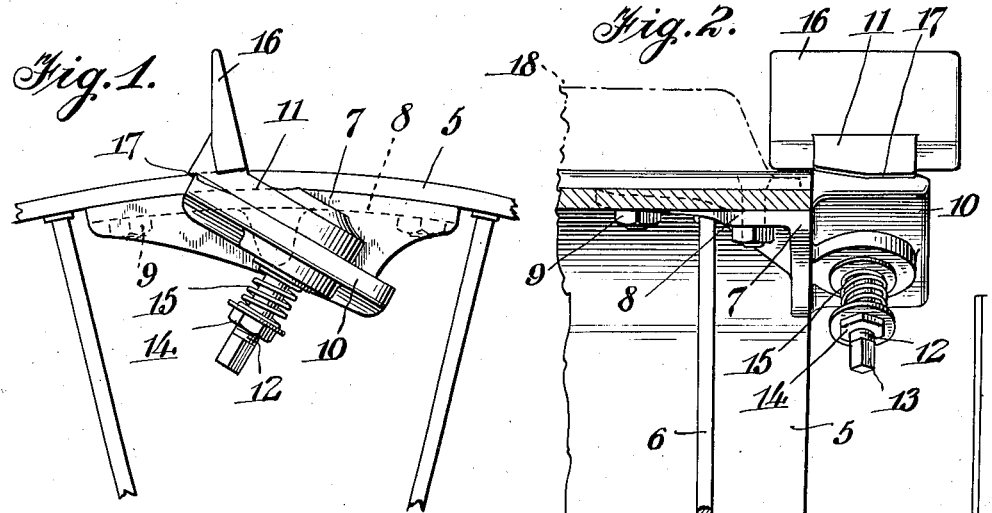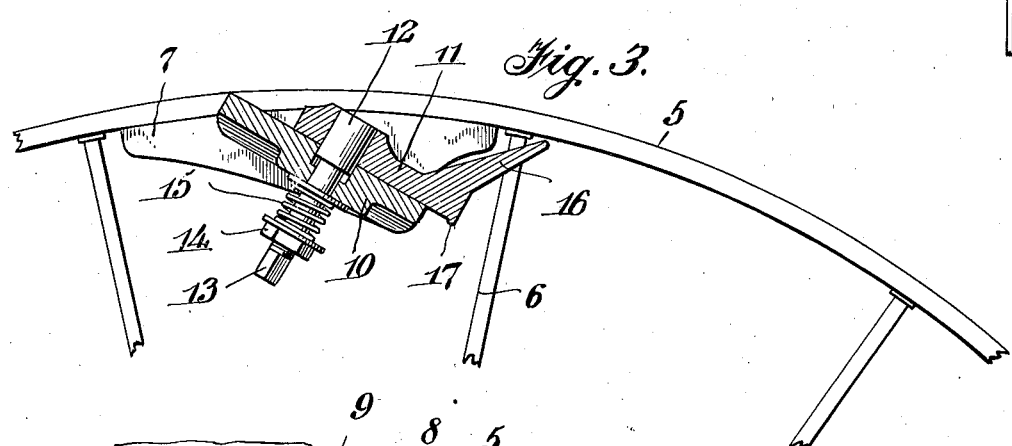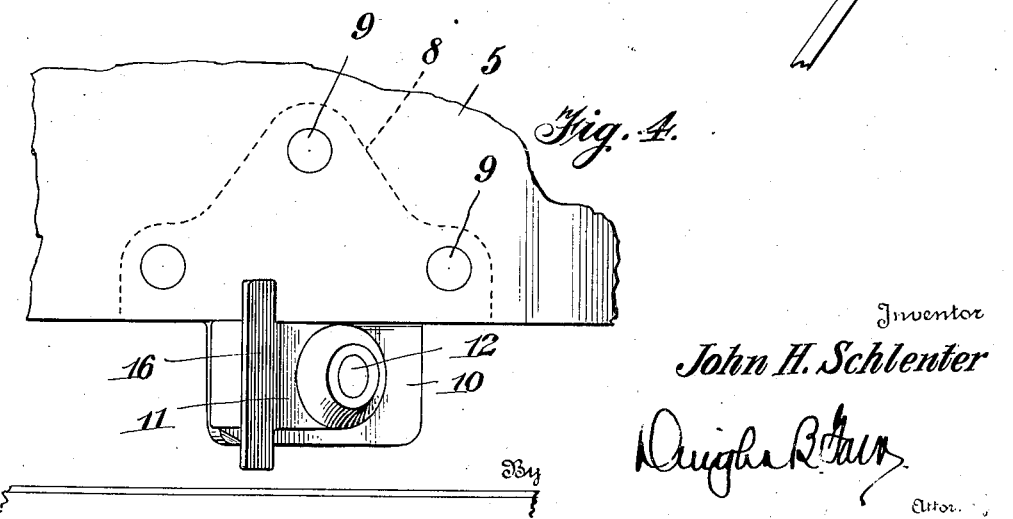

2,118,269

UNITED STATES PATENT OFFICE 2,118,269

CLEAT FOR VEHICLE WHEELS

John H. Schlenter, Cascade, Wis.

Application July 1, 1937, Serial No. 151,522

10 Claims. (Cl. 301—50)

This invention relates to traction increasing devices for the drive wheels of motor vehicles, the primary object of which is to enable the cleats or traction increasing members to be projected or retracted when desired.

The invention is adapted for use particularly upon the wheels of tractors or other motor vehicles for heavy work and upon an even or soft ground, affording the desired traction when required, but permitting of the wheels traveling upon their tires or rims when the vehicle moves over hard ground or paved surfaces.

A further object of the invention is to provide traction cleats for wheels which are so mounted as to be capable of being readily projected or retracted as occasion demands, with the exercise of only ordinary ability or skill and without the use of special instruments.

A further object is to provide an attachment for the power wheels of motor vehicles to increase the tractive power thereof, and which is so constructed as to be adaptable to steel tired rims or those equipped with either solid or pneumatic treads.

A further object of the invention is to provide an attachment for the purposes generally stated, and which is so constructed as to be readily applied to wheels now in use and without resort to wheels of special construction.

Further objects reside in the provision of a device of the character and for the purposes stated which is of simple and comparatively inexpensive construction, which may be readily applied to the traction wheel, which may be easily and quickly operated to either projected or retracted positions, which has its parts so constructed and assembled as to minimize the opportunity for wear, breakage or derangement, and which will prove highly practical and efficient in use.

In the drawing:

Figure 1 is a fragmentary side elevation of a conventional form of tractor wheel equipped with an attachment embodying my invention, and wherein the cleat is shown in projected position, Figure 2 is a transverse sectional view taken through the rim and showing the attachment in end elevation, Figure 3 is a view similar to Figure 1, illustrating the attachment in cross section, and with the cleat in retracted position, and Figure 4 is a fragmentary top plan view of the wheel and attachment as shown in Figure 1.

The invention resides generally in a casting to be associated with the traction wheel and having an offset portion to which the cleat member is attached. This offset portion is so arranged as to dispose the cleat to one side of the wheel or out of the tread thereof, so that the cleat may be associated either with solid steel rims or with rims having pneumatic or cushion tires mounted thereon. The wheel may be equipped with any desired or required number of these cleats, the number being determined largely by the diameter of the wheel. Each of the cleats or gripper members is so arranged as to be turned by simple and easy operations, either to project the tooth or to retract the same within the periphery of the ground engaging surface of the wheel. Means are associated with the casting and the cleat so as to rigidly maintain the cleat in both retracted or projected positions.

The drawing discloses preferred means for carrying these various objects into effect, and where 5 indicates the steel rim of a traction wheel having the spoke 6 associated therewith as will be understood. Each unit constituting the traction increasing device includes a casting indicated at 7 having a relatively large web 8 so shaped as to lie upon and assume the contour of the inner periphery of the rim 5. This web is provided with suitable openings through which pass bolts 9 in any desired number to rigidly secure the web to the wheel rim.

The casting has projecting from one side thereof, and beyond the side of the rim, a supporting member 10. This member is preferably cast integral with the web and consists preferably of a flat platform or surface extending inwardly from the rim of the wheel at an angle substantially less than 90° to a tangent drawn to the rim at the point of intersection of the rim and the plane of the platform or surface. The lug or cleat includes a plate 11 pivoted near one end to the support 10 intermediate the ends of the latter, the pivot including a shaft 12 rigidly secured at one end to the cleat 11 and rotatably mounted in an opening through the support 10. The shaft 12 projects inwardly from the rim, and its inner extremity is squared as at 13 so as to be capable of being readily engaged and rotated by the squared end of a special tool or a wrench as desired. The shaft has a threaded portion as shown, and upon which is engaged a nut 14; an expansion spring 15 circling the shaft being disposed between the nut and the support 10.

The longer end of the plate 11 is provided with an angularly disposed prong or tooth 16 so disposed as to project beyond the periphery of the wheel when the plate 11 is in one position, but which is retracted or wholly disposed inwardly of the wheel periphery when the plate 11 is moved to reverse position. The underside of plate 11 at the toothed end thereof is provided with a depending shoulder 17 to snap over and engage with the outer edge of the support 10 when the cleat is in projected or operative position.

With reference to Figure 1 of the drawing, it will be seen that the shaft has been so rotated as to move plate 11 so that the tooth or cleat member 16 is in projected or operative position, with the shoulder 17 engaged with the adjacent end of support 10. This interlocking engagement, together with the frictional contact exerted between the cleat and the support by the spring 15, rigidly holds the cleat in position and against accidental displacement as the wheel rotates and the cleat engages the ground.

When it is desired to retract the cleats, as would be required should the vehicle travel upon paved or improved highways, it is but necessary to apply a wrench to the squared end 13 of the shaft 12 and rotate the said shaft 180 degrees. This rotation moves the cleat end 16 to the position shown in Figure 3 of the drawing, or out of contact with the ground as the wheel rotates. When in this position the friction exerted by spring 15 will be sufficient to hold the cleats against accidental movement. This degree of friction may be increased when required by rotating the nut 14 in the proper direction.

The device is so constructed that it is capable of ready attachment to wheels other than those of the steel tire type, as is shown in Figure 2. In this figure the dotted lines 18 represent a conventional form of cushion tire such as is sometimes used upon tractors. The cleat is sufficiently long to project beyond the periphery of the tire and at the same time the formation or structure of the latter in no way interferes with proper operation of the cleat.

The foregoing is a description of the invention in its preferred embodiment, but it will be understood that variations in the minor details of construction and assemblage of parts may be resorted to if desired without departing from the spirit of the invention as defined by the claims.

Having thus described my invention, what I claim as new and useful is:

1. In a traction device for wheels, a support on one side of said wheel and near the periphery thereof, said support having a flat surface extending inwardly from said rim at an angle substantially less than 90° to a tangent drawn to the rim at the point of intersection of the rim and the plane of said flat surface, a cleat pivoted on said surface and movable parallel therewith, a tooth on one end of said cleat projecting beyond the periphery of the wheel when the cleat is in one position, and means for holding said cleat to said support.

2. In a traction device for wheels, a support on one side of said wheel and near the periphery thereof, said support having a flat surface extending inwardly from said rim at an angle substantially less than 90° to a tangent drawn to the rim at the point of intersection of the rim and the plane of said flat surface, a plate pivoted to rotate on said surface, a tooth on one end of said plate, said tooth so disposed as to project beyond the periphery of the wheel when the plate is in one position, and a stem for rotating said plate.

3. In a traction device for wheels, a support on a side of said wheel and near the periphery thereof, said support having a flat surface extending inwardly from said rim at an angle substantially less than 90° to a tangent drawn to the rim at the point of intersection of the rim and the plane of said flat surface, a plate pivoted eccentrically upon said surface and movable in the plane of the latter, one end of said plate projecting beyond the periphery of the wheel when the plate is in one position, and means on said support for moving said plate.

4. In a traction device for wheels, a support secured on a side of said wheel and near the periphery thereof, said support having a flat surface extending inwardly from said rim at an angle substantially less than 90° to a tangent drawn to the rim at the point of intersection of the rim and the plane of said flat surface, a plate mounted on said surface, a shaft secured at one end to said plate and rotatably mounted on said support, a tooth on one end of said plate, and said tooth so positioned on said plate as to extend beyond the periphery of the wheel when the plate has been moved to one position.

5. In a traction device for wheels, a support secured on a side of said wheel and near the periphery thereof, said support having a flat surface extending inwardly from said rim at an angle substantially less than 90° to a tangent drawn to the rim at the point of intersection of the rim and the plane of said flat surface, a plate, a shaft secured at one end to said plate and rotatably extending through said support at right angles to said surface, a nut on said shaft, an expansion spring encircling said shaft and interposed between said nut and said support, and one end of said plate projecting beyond the periphery of said wheel when the plate has been moved to one position.

6. In a traction device for wheels, a support secured on a side of said wheel and near the periphery thereof, said support having a flat surface extending inwardly from said rim at an angle substantially less than 90° to a tangent drawn to the rim at the point of intersection of the rim and the plane of said flat surface, a plate on said surface, a shaft secured at one end to said plate and rotatably extending through said support, a nut on said shaft, an expansion spring encircling said shaft and interposed between said nut and said support, one end of said plate projecting beyond the periphery of said wheel when the plate has been moved to one position, and means on said plate to cooperate with said support to hold the plate against rotation.

7. In a traction device for wheels, a support secured on a side of said wheel and near the periphery thereof, said support having a flat surface extending inwardly from said rim at an angle substantially less than 90° to a tangent drawn to the rim at the point of intersection of the rim and the plane of said flat surface, a plate rotatable upon said surface, a lug on said plate to lock with an end of said support when the plate has been moved to one position thereon, and a tooth on said plate disposed beyond the periphery of said wheel when the plate has been moved to said position.

8. In a traction device for wheels, a support affixed to the rim of said wheel and projecting beyond one side of the latter, said support providing a flat surface extending inwardly from said rim at an angle substantially less than 90° to a tangent drawn to the rim at the point of intersection of the rim and the plane of said flat surface, a cleat pivoted on said support and movable in the plane of the latter, and means for holding said cleat in position on said support.

9. In a traction device for wheels, a support affixed to the rim of the wheel and projecting beyond one side of the latter, said support providing a flat surface extending inwardly from said rim at an angle substantially less than 90° to a tangent drawn to the rim at the point of intersection of the rim and the plane of said flat surface, a cleat slidable on said support in the plane of said surface, and means for holding said cleat in adjusted positions on said support.

10. In a traction device for wheels, a support affixed to the rim of the wheel and projecting beyond one side of the latter, said support providing a flat surface extending inwardly from said rim at an angle substantially less than 90° to a tangent drawn to the rim at the point of intersection of the rim and the plane of said flat surface, a cleat on said support movable in the plane of said flat surface to be projected beyond or retracted from the rim of said wheel, and means for holding said cleat in adjusted positions.

JOHN H. SCHLENTER.